June 27, 1961  J. P. DUNNE  2,989,955
ROTARY VALVE ENGINE
Filed April 22, 1957  5 Sheets-Sheet 1
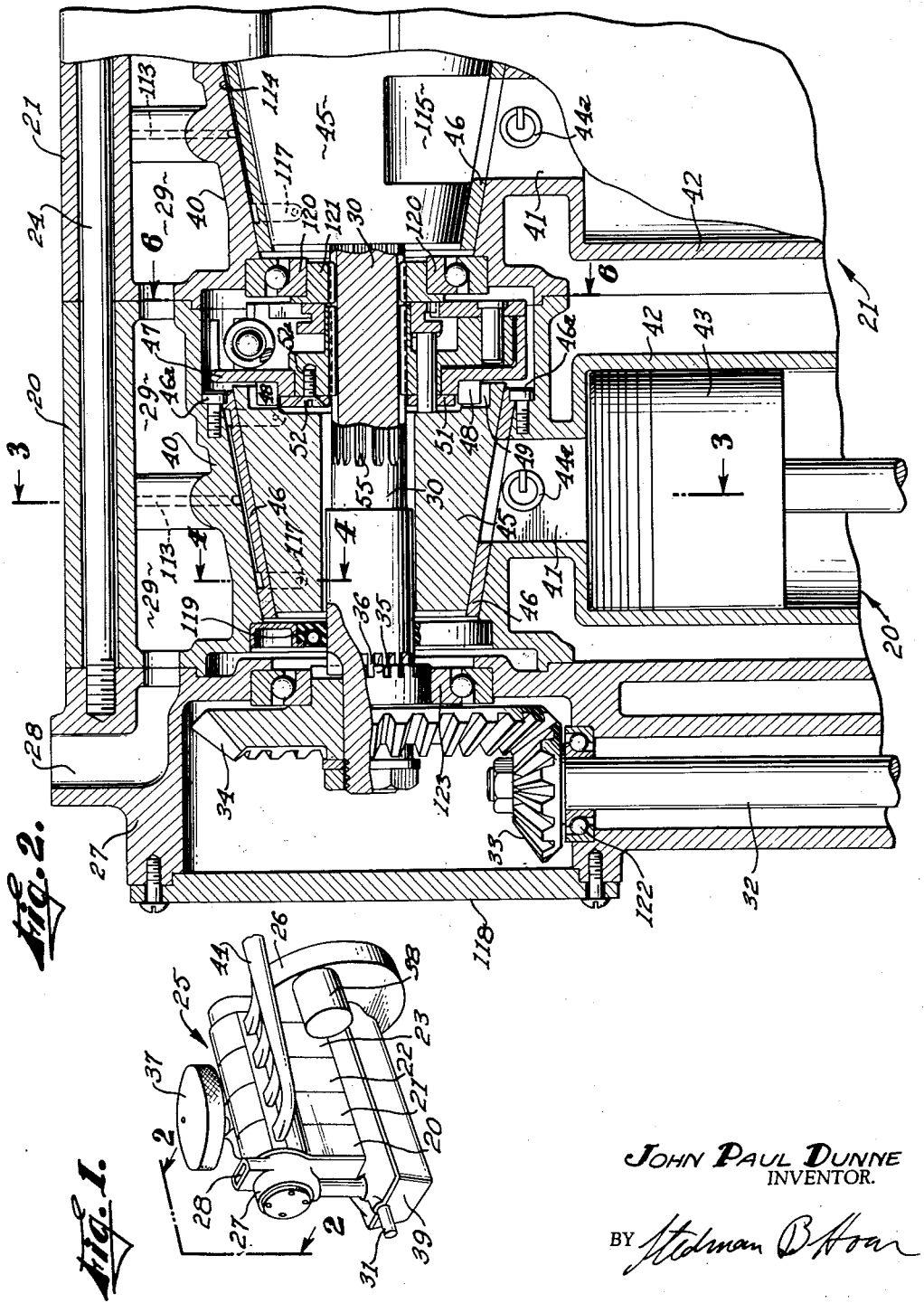
JOHN PAUL DUNNE
INVENTOR.
BY *[signature]*
AGENT

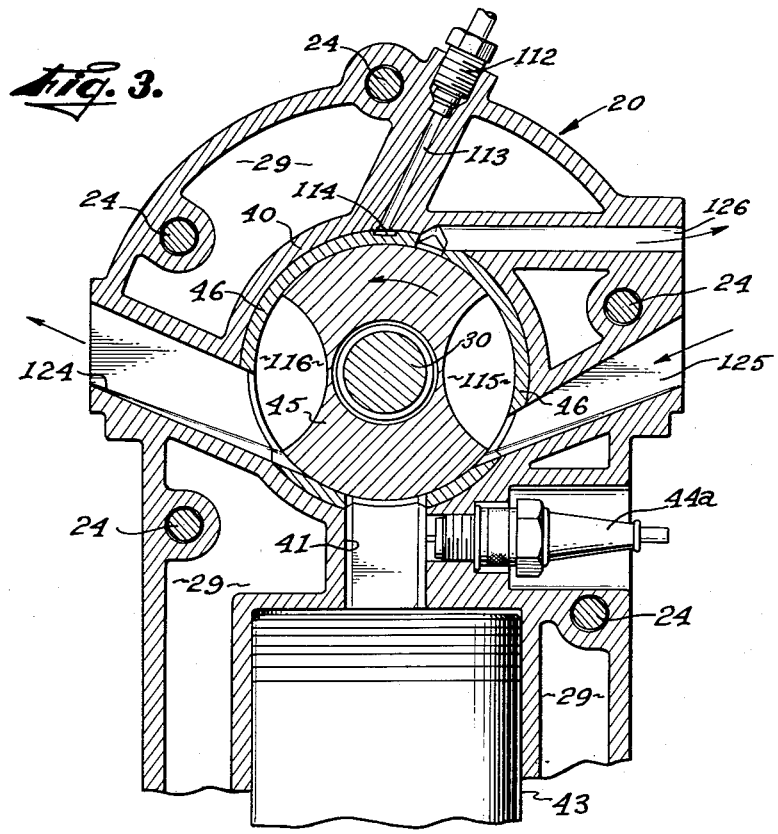
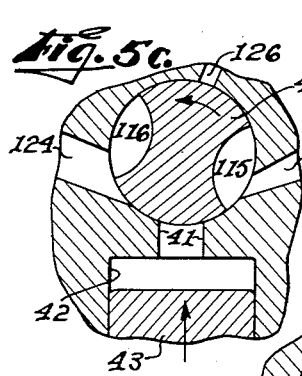
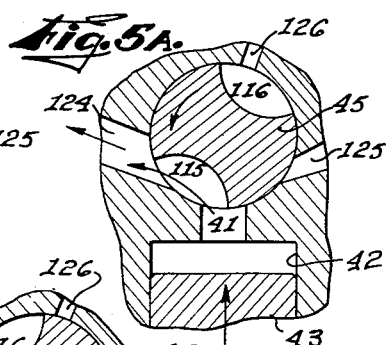
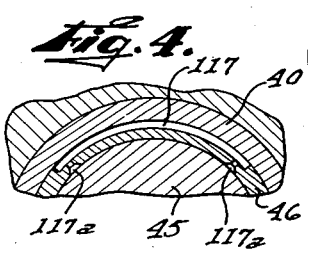
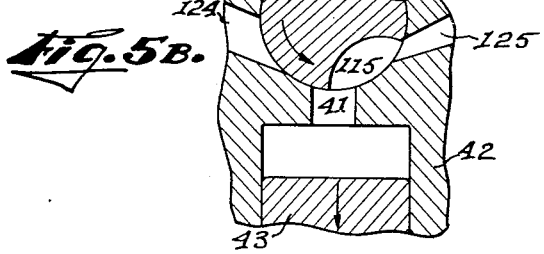

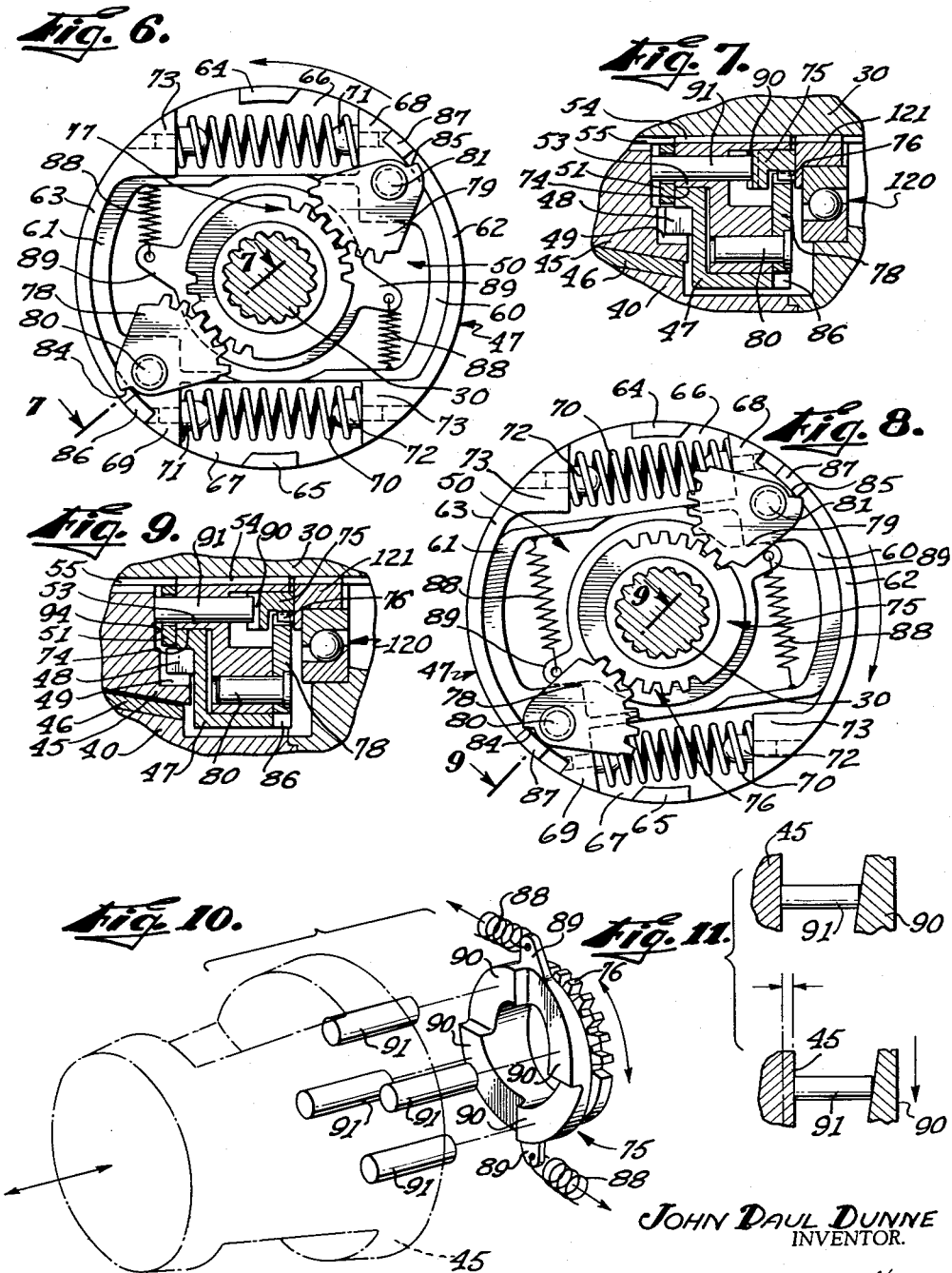

June 27, 1961  J. P. DUNNE  2,989,955
ROTARY VALVE ENGINE
Filed April 22, 1957  5 Sheets-Sheet 4

JOHN PAUL DUNNE
INVENTOR.

BY

AGENT

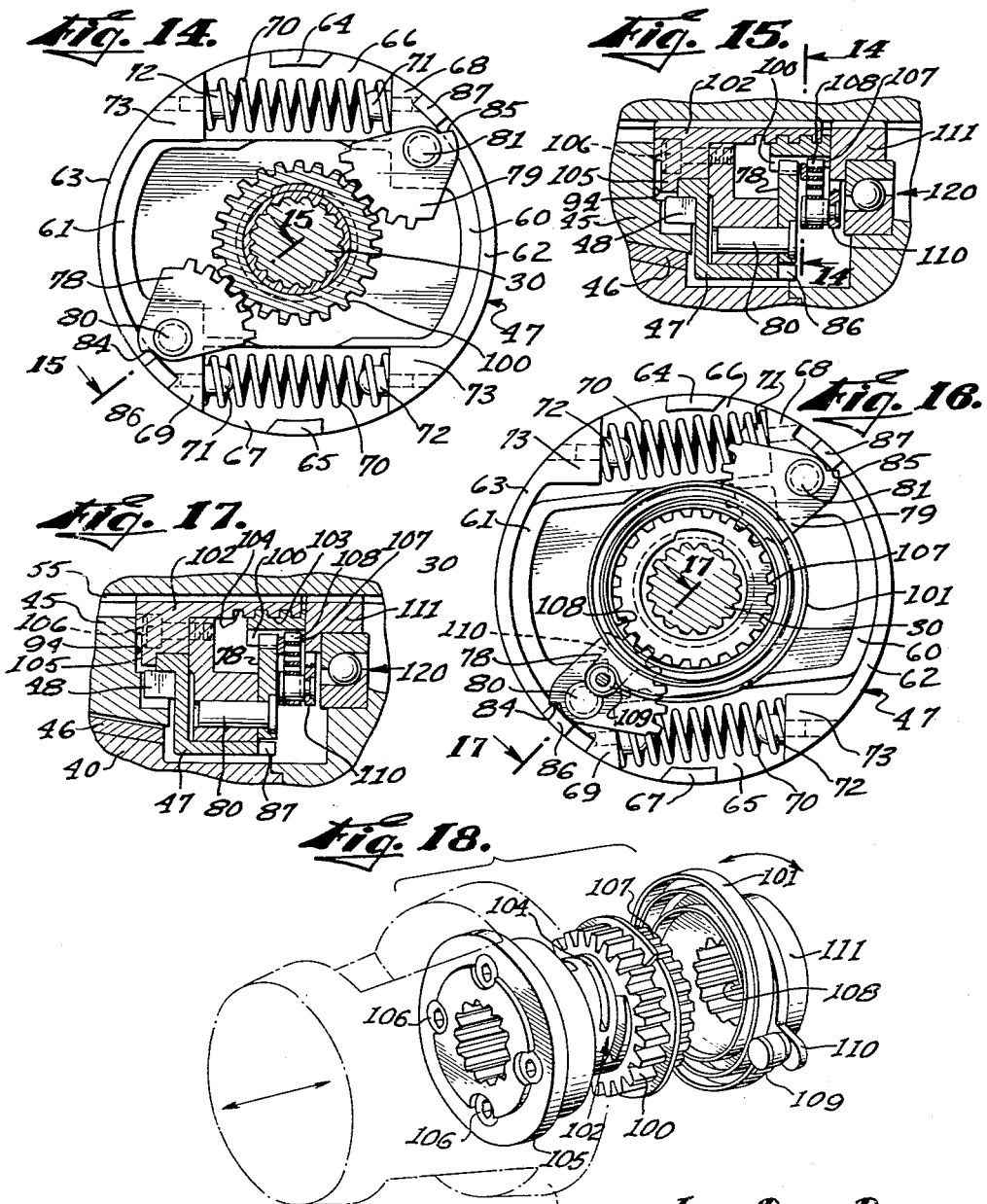

2,989,955
ROTARY VALVE ENGINE
John Paul Dunne, 687 W. 18th St., Costa Mesa, Calif.
Filed Apr. 22, 1957, Ser. No. 654,183
7 Claims. (Cl. 123—59)

This invention relates to internal combustion engines, and more particularly relates to rotary valve engines.

Internal combustion engineers have long been fascinated with the known and attributed advantages of rotary valve over reciprocating valves. Among these advantages are the provision of larger ports than poppet valves allow, the avoidance of hot spots in the combustion chamber, increased compression ratio, and cooler valves because no part of the valve remains constantly exposed to the combustion chamber. However, in spite of the great amount of engineering talent that has been expended in attempts to develop a satisfactory rotary valve, these attempts have as a whole proved to be futile. Maintaining a frusto-conical valve body in contact with a similarly shaped seat under conditions of changing pressure and temperature has presented extensive problems. Some of the related problems, such as cooling and lubrication, have been solved, and too often the solution has been assumed to be a solution of the whole problem. In my Patent 2,412,448, I have disclosed a rotary type valve and lubricating mechanism therefor, which, while fully operable, were not the full answer.

One of the chief difficulties with valve mechanisms of the rotary type has been the tendency to bind after a continuous and satisfactory operating period of some duration. It has generally been believed that this binding was due to a gradual build-up of temperature. However, I have established the fact that the binding may occur after the temperature has become stabilized. I have found that the binding is not entirely due to either sudden or prolonged build-ups of temperature, but on the contrary is largely caused by either sudden or prolonged changes of pressure, which cause the heated metal to yield.

In experiments on the herein described valve driving mechanism the importance of the changing factor of pressure became apparent. As will be presently described in detail, my improved valve-drive operates for each individual valve through a set of springs which are permitted very limited motion. For brevity and clarity the action will be described as for a single valve. When the valve rotates freely the springs are under a minimum of compression. But when the valve tends to bind, the springs compress and in doing so they cause other spring means to change the position of a cam which permits the valve to move in the direction of freeing itself with respect to the valve seat. In a modification of the invention, said other spring means cause oscillation of a gear collar upon threads by which the valve is moved in relation to its seat. In either form of the invention there is only an extremely slight longitudinal movement of the frusto-conical valve, but unless steps are taken to regulate the pressure factor, there is a noticeable tendency to "hunt." The valve does not stay in one place, but alternately tightens and seeks relief. This, of course, is exactly what it is supposed to do, if conditions are not optimum; the fact that "hunting" occurs indicates that conditions are not optimum.

Experiments were conducted upon an internal combustion engine built, except for the valve mechanism, in a conventional manner. I have found that even after temperature conditions are stabilized on a conventional engine block, the valve will continue to hunt. But I have also found that by radically changing the engine block in what I believe to be an entirely novel manner, I am able to control the transmission of pressure through the block and cause the valve to cease its constant hunting. To attain this end I have built an engine block comprising a number of integral units each of which is the housing for one cylinder, one combustion chamber, one valve mechanism, one intake and one exhaust connection, and a part of a cooling system. Instead of having a cylinder head bolted to a cylinder, the cylinder head is integral with the cylinder, the cylinder however being divided from the crankcase, and these integral units are secured together to form an engine of as many cylinders as may be desired. Thus the part which houses the valve mechanism is of one piece with the part which houses the piston, for the full length of the piston's travel, and pressures generated within the unit are transmitted uniformly, with both parts receiving like stresses. With the conventional cylinder head bolted to the conventional piston housing, no matter how tightly the bolts are taken up, there is a slight yielding at the division line. With conical valves, the valve seat is at this division line, this being the entrance to the combustion chamber, and the seat yields and warps while the valve does not yield. Of course, by greatly increasing the weight of metal in the conventional engine, it might be possible to reduce pressure differentials, but as one object of my invention is to reduce the weight of the engine per horsepower developed, addition of weight is not desirable.

It is another object of my invention to provide a rotary valve having novel drive means which at all times permit the valve to rotate freely in its seat.

A more detailed object of my invention is to provide a rotary valve for which the driving mechanism acts through resilient means, these means being responsive to increase of torque at the valve to actuate valve-releasing mechanism.

More particularly it is an object of my invention to provide resilient means controlling the tightness of a rotary valve upon its seat, which instead of acting upon the valve in a direct or linear manner, as has been conventional, to force the valve into tight contact with the valve seat, act upon intermediate means which yield even as the resilient means yield to torque upon the valve, to permit the valve to move in a tightness-reducing manner, thus reversing the ordinary procedure of permitting a valve to move but reluctantly and with increasing tension.

The objects of my invention may also be expressed as maintaining at all times an even and equal seating force upon a conical rotary valve, regardless of the expansion of the valve or of the seat.

Further objects of my invention are to provide valve-control mechanism which is easy to install, which requires the minimum of adjustment and which because of its indirect relation to stresses and tensions upon it is relatively immune from mechanical failure.

Other objects and useful advantages of my invention will become apparent as the following description develops.

In the accompanying drawings, illustrative of a presently preferred embodiment of my invention and of a modified form of valve-drive, FIG. 1 is a perspective view of an engine constructed according to my invention;

FIG. 2 is a longitudinal sectional view on an enlarged scale, taken on the line of section 2—2 of FIG. 1, and showing in detail one valve and the driving mechanism therefor;

FIG. 3 is a transverse sectional view on the same scale as FIG. 2 and on the line 3—3 thereof;

FIG. 4 is a fragmentary transverse sectional view on the line 4—4 of FIG. 2, showing details of the valve lubricating system;

Figure 12:
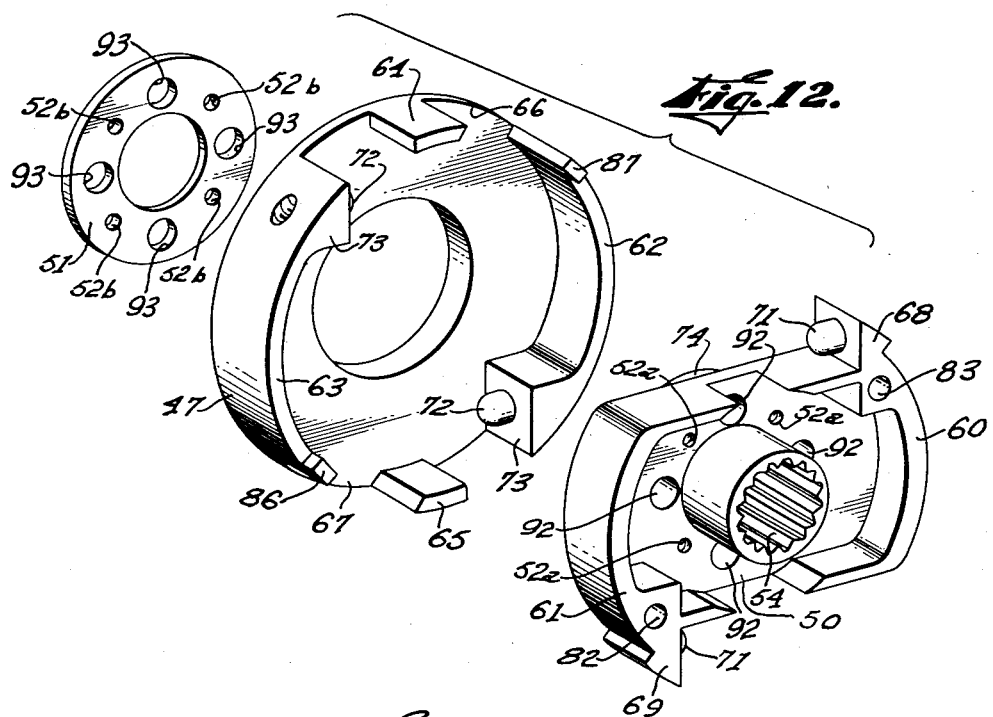
Figure 13:
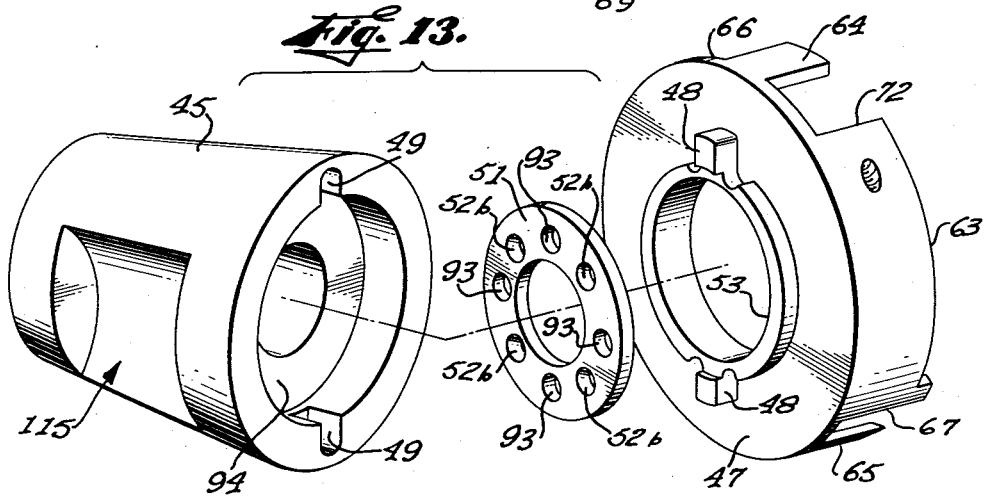

FIGS. 5a, 5b, and 5c are schematic views on a reduced scale, showing the operation of a valve in relation to the piston cycle;

FIG. 6 is a transverse sectional view of a preferred valve driving mechanism taken on the line 6—6 of FIG. 2, and showing the mechanism at its free-running position, with torque drag upon the valve at a minimum;

FIG. 7 is a fragmentary sectional view on the line 7—7 of FIG. 6, showing cam-actuated push-rods pushing against the valve to thrust it home into its seat;

FIG. 8 is a view similar to FIG. 6 and on the same line of section, but showing the valve driving mechanism operating under torque drag;

FIG. 9 is a fragmentary sectional view on the line 9—9 of FIG. 8, and similar to FIG. 7, but showing the cam-actuated push-rods released to permit the valve to move to a more free position on its seat;

FIG. 10 is an exploded perspective view of the valve clearance control cam and the push-rods actuated thereby, the valve itself being shown in broken line;

FIG. 11 is a schematic view illustrating the action of the valve clearance control cam in acting upon the push-rods and thus upon the valve, the cam being shown in advanced and released positions;

FIGS. 12 and 13 are exploded perspective views of detail parts of the aforesaid preferred embodiment of the valve driving mechanism, FIG. 12 showing a plate for transmitting torque from the valve in relation to a coupling plate driven from the main valve shaft, and FIG. 13 showing the torque-transmitting plate in relation to the valve;

FIG. 14 illustrates a modified form of valve-driving mechanism in which threads insteads of cams actuate the device;

FIG. 15 is a fragmentary sectional view on the line 15—15 of FIG. 14, the valve being shown pushed home upon its seat;

FIG. 16 is a view similar to FIG. 14 showing the valve driving mechanism under torque drag;

FIG. 17 is a fragmentary sectional view on the line 17—17 of FIG. 16; and

FIG. 18 is an exploded perspective view of the threaded valve-driving mechanism, FIGS. 14, 15, 16, 17, and 18 corresponding in general to FIGS. 6, 7, 8, 9, and 10 of the preferred mechanism.

Having reference to the details of the drawings, I have shown in FIGS. 1 and 2 an engine having the conventional appearance of a four-cylinder internal combustion engine, except for the fact the four cylinders 20, 21, 22, 23 are individually cast, and are secured together by bolts 24 in parallel side-by-side relationship to form an elongated engine block 25. The cylinders are clamped by the bolts 24 between a conventional fly-wheel housing 26, and a valve gear housing 27 which may also include a water inlet 28 to a water-jacket 29. Power for a valve shaft 30 is taken from the main shaft 31 and trained through shaft 32 and bevel gears 33 and 34, the latter interlocking with the valve shaft 30 by means of a crown gear 35 meshing with a similar crown gear 36 on the end of the shaft 30. The entire assemblage, shown with filter 37 and starter 38, is assembled on a crankcase 39. It is to be observed that the cylinders 21, 22, 23, 24 are integral units which include valve housings 40, combustion chambers 41, and cylinder walls 42 extending below the travel of pistons 43, with the usual exhaust manifold 44 attached at the level of the combustion chambers. Spark plugs 44a are admitted to the combustion chambers 39 from the side, rather than from above.

The valve shaft 30 has mounted upon it frusto-conical valves 45, one for each of the cylinders 20, 21, 22, 23. The valves 45 rotate in seat sleeves 46 secured to the valve housing 40 by screws 46a. As the construction and operation of the valves is alike, only the valve 45 in cylinder 20 will be described. It will be obvious that the engine may have a number of cylinders differing from the number shown.

Contrary to the usual practice, the valve 45 is not secured to the valve shaft 30, but is free to float upon it, within narrow limits, both rotationally and longitudinally. The valve 45 is caused to rotate by a torque plate 47 (see FIGS. 12 and 13) which is provided with lugs 48 fitting into sockets 49 in the valve 45. Because of the fit of the lugs 48 in the sockets 49, the valve is constrained to rotate in unison with the torque plate 47, but has relative longitudinal movement, as the lugs may enter the sockets to a greater or less degree. The torque plate 47, in its turn is held between a coupling plate 50 and a washer 51 by screws 52. The central orifice 53 of the torque plate 47 is of greater diameter than the circle of the screw-holes 52a in the coupling plate 50 or the corresponding circle of holes 52b in the washer 51, which hold the screws 52. The torque plate 47 is therefore, like the valve 45, not directly connected to the valve shaft 30, but may rotate relatively to the valve shaft and to the coupling plate 50. The torque plate 47 however may not move longitudinally of the valve shaft 30 independently of the coupling plate 50, to which it is clamped by the washer 51. The coupling plate 50, on the other hand, is rotatively relatively secured to the shaft 30 by splines 54 engaging with splines 55 on the shaft 30. Although the coupling plate is rotatively fixed to the shaft 30, the splines 54 and 55 may slip longitudinally, and the coupling plate therefore may move lengthwise of the shaft 30.

The foregoing will now be restated to make clear the reason for the structure. The nature and construction of the engine block 25 should be kept in mind, also the fact that the valve stem 30 may have a little end play as it proceeds through cylinders 20, 21, 22, 23, due to relative expansion and as permitted by crown gears 35 and 36. It should also be borne in mind that the end sought is to keep the valves 45 pushed into the seat sleeves 46 as tightly as necessary but to permit the valves to move from the sleeves if they being to bind.

Beginning with the valve shaft 30 which rotates and may have a little lengthwise movement, the valve shaft causes like rotation of the coupling plate 50. The coupling plate rotates in unison with the valve shaft, but is able to slide lengthwise thereon. The coupling plate moves the torque plate 47, permitting a small relative rotational movement but no relative lengthwise movement. The torque plate 47 moves the valve 45 with uniform rotational movement, but permits a little lengthwise movement. Therefore, relatively to the valve shaft 30, the valve 45 may vary rotationally by the amount of relative rotation of the coupling plate 50 and the torque plate 47; it may also vary in lengthwise movement by the amount of lengthwise slippage between the splines 54 and 55, and by the movement of the lugs 48 in the sockets 49.

These permitted relative movements are of very small extent and are under stringent controls, now to be described. The coupling plate 50 has two circular flanges 60 and 61 which have rotational movement within and relatively to circular flanges 62 and 63 on the torque plate 47, the torque plate flanges being exterior to the coupling plate flanges. The torque plate 47 also has flange arcs 64 and 65, on the same circle as the flanges 62 and 63 and separated from the latter by gates 66 and 67. The coupling plate 50 has outwardly enlarged shoulders 68 and 69 at like ends of its flanges 60 and 61, these shoulders extending into the gates 66 and 67 where they limit relative rotation of the torque plate 47 and the coupling plate 50 by abutment on either the flanges 62 and 63 or on the flange arcs 64 and 65.

However, even the small relative movement permitted by oscillation of the shoulders 68 and 69 in the gates 66 and 67 exceeds the movement actually allowed. The allowed movement is controlled by torque-responsive springs 70 (FIGS. 6 and 8) which are mounted between posts 71 set in the shoulders 68 and 69 of the coupling plate 50 and posts 72 set in enlarged ends 73 of the torque plate flanges 62 and 63. The torque springs 70 are placed under a pre-load compression sufficient to hold the torque plate 47 and the coupling plate 50 in the relative positions shown in FIG. 6 in all normal conditions—that is, with the shoulders 68 and 69 abutted upon the flanges 62, 63. Only when binding causes the valve torque to overcome the pre-loading compression do the torque springs 70 yield, as shown in FIG. 8; and as will presently be shown a very small yielding will permit the valve to free itself.

Carried rotatably on the collar 74 of the coupling plate 50 is a valve clearance control cam plate 75, best shown in FIG. 10. On one side of the cam plate are circumferential gears 76 and 77 which mesh with gear segments 78 and 79 carried on posts 80 and 81 pivoted in holes 82 and 83 in the end portions of flanges 60 and 61 of the coupling plate 50. The gear segments 78 and 79 have shoulders 84 and 85 respectively, which may abut lugs 86 and 87 on the torque plate flanges 62 and 63. When there is relative movement between the torque plate 47 and the coupling plate 50, the lugs 86 and 87 abut the shoulders 84 and 85, causing rotation of the gear segments 78 and 79, and consequently rotation of the cam plate 75. When the torque plate 47 moves back to the position shown in FIG. 6, the cam plate 75 is returned to the position shown in FIG. 6 by springs 88 attached to arms 89 on the cam plate and to the coupling plate 50.

On the other side of the cam plate 75 from the circumferential gears 76 and 77 are face cams 90. The cams 90 act upon push rods 91, extending slidably through holes 92 in the coupling plate 50 and registering holes 93 in the washer 51. The rods 91, when pushed, push against the bottom of a recess 94 in the larger face of the valve 45. When rotation of the cam plate 75 allows the push rods 91 to retract from the valve 45, the valve is free to move away from its seat, as hitherto explained, by relative slippage of the splines 54 and 55 and by slippage of the lugs 48 in the socket 49.

The valve 45 is, of course, normally advanced as far as possible toward its small end by the pushing of the push-rods 91. The cam plate 75 is, in those circumstances, pulled counterclockwise, as seen in FIG. 10, by the springs 88, with the push rods 91 riding the higher ends of the cams 90. This position of the cam plate 75 is permitted because the valve 45 is not exerting torque through the lugs 48 upon the torque plate 47 and the torque springs 70—that is, not beyond the pre-loading of the springs 70—and therefore the lugs 86 and 87 are not forcing the gear segments 78 and 79 to rotate the cam plate 75. When the valve torque exceeds the pre-loading of the springs 70, the cam plate 75 is rotated to allow the push-rods 91 to contact lower levels of the cams 90, and the valve may consequently free itself.

In FIGS. 14 to 18 I have shown a modified form of my invention in which the cam plate 75, springs 88, and push rods 91 are replaced by a threaded gear 100, spiral spring 101 and collar 102. In this form of my invention, when valve torque causes compression of the torque springs 70 beyond their initial pre-loading, and moves the torque plate 47 relatively to the coupling plate 50 so that the lugs 86 and 87 swing the gear segments 78 and 79, the gear segments turn a gear 100 which surrounds a collar 102 which is splined to the valve shaft 30 but which may slide lengthwise of the shaft upon the splines 55. The gear 100 has female threads 103 on its internal surface, meshing with male threads 104 upon the exterior of the collar 102. Thus rotation of the gear 100 causes the collar 102 to move forward or backward upon the shaft 30. The collar 102 has an enlarged end 105 which fits within the recess 94 of the valve 45 and pushes thereon in the same manner as the push rods 91 of the preferred form of my invention. The end 105 may be separate from the collar portion and be secured thereto by screws 106. When the enlarged end 105 is pulled away from the valve 45 by rotation of the gear 100, the valve is permitted to ease itself in its seat 46. The gear 100 has secured to it a toothed ring 107, in the teeth of which one end 108 of the spiral spring 101 is caught. The other end 109 of the spring 101 is secured to an arm 110 of a spring support 111 splined to the valve shaft 30. The spring 101 acts in the same manner as the springs 88, hitherto described, urging the toothed ring 107 and the attached gear 100 to rotate so as to move the end 105 against the valve 45, and when the gear is forced to rotate in the opposite direction by the gear segments 78 and 79, then to yield to permit the end 105 to move away from the valve and to let the valve ease itself, as shown by the double arrow on the valve 45 in FIG. 18.

Reverting to FIGS. 2, 3, and 4, lubrication of valve 45 is accomplished by means of oil passages fed from oil conduits 112. In each valve housing 40 the oil conduit 112 communicates with a passage 113 which in turn communicates with a passage 114 on the exterior of the valve sleeve 46 and extending lengthwise of the valve sleeve. The ends of the passage 114 extend beyond ports 115 and 116 in the valve 45 and communicate with arcuate passages 117 which extend around the valve 45 sufficiently to spread the lubricating oil and connect through the valve sleeve to the surface of the valve at holes 117a. The valve gears 33 and 34 are accessible through a plate 118 secured to the front of the valve gear housing 27, through which they may be greased. A packing ring 119 at the forward end of the valve shaft 30 prevents grease from the gear 34 from leaking along the shaft 30.

Ball bearings 120, situated between individual valves 45 at approximately the division line between cylinder units and therefore accessible when the cylinder units are separated, act not only as supports for the valve shaft 30 but as thrust bearings. The bearings 120 are mounted on hubs 121, splined to the valve shaft 30. In the preferred form of my invention, the hubs 121 receive the thrust of the valve control cam plates 75, thereby stabilizing the position of the plates 75 and causing them, by rotation, to move the push-rods 91 and to keep the valves 45 pressed to their seats. In the modified form of my invention, the hubs 121 may include the spring supports 111 and arms 110 holding the springs 101.

Additional ball-bearings 122 and 123 receive the thrust of the bevel gears 33 and 34.

As this invention relates primarily to valve construction and operation, it is not deemed necessary to dwell at length on the method of operation of an engine. The engine illustrated herewith is a four-cycle engine, operating in the well-known manner. The valves 45 have two ports, 115 and 116, both of which act both as inlet and exhaust valves. The valve shaft 30 rotates at one-fourth speed of the crank shaft 31. Since a complete loading, compression, firing, and exhaust takes place in a given cylinder in two revolutions of the crank shaft, it will be apparent that one of the valve ports is active during the same four operations and then ceases to be active while the other valve port takes over and is active. The relatively slow rotation of the valves 45 surrounded as they are by a water-jacket produces a very cool running engine.

If the valve port 115 be taken as the active port in FIGS. 5a, 5b, and 5c the valve cycle may be said to begin with the exhaust or scravenging stroke of the piston 43, shown in FIG. 5a. At this stage, port 115 has begun to cross the lower half of the valve circle of revolution and is bridging between the combustion chamber 41 and the outlet 124. An instant later, as shown in FIG. 5b, the port 115 is bridging between the combustion chamber and the inlet 125, while the descending piston 43 draws fuel into the combustion chamber. At another instant later, the port 115 has cut off from the combustion chamber, and the fuel is being compressed by the rising piston 43 as shown in FIG. 5c. FIG. 3 illustrates the approximate position at the instant of firing, with valve 116 coming into the lower half of the circle of revolution and about to permit the burned gases to be exhausted. As each of the valve ports in turn passes upward into the upper inactive half of the circle of revolution, it may be partially vacuumized by the inlet 125, particularly if the engine is running slowly, and may tend to draw oil from the oil passages 114, 117 and 117a. To avoid this, the port is caused to pass a vacuum-relief port 126 which may be connected to the air filter 37.

It will be apparent that since the combustion chamber 41 need not have even the width of one of the valve ports, and need have only the depth to accommodate a spark plug, a very high compression ratio may be obtained. The two closed sectors of the valve alternately receive the heat of combustion, and convey it to zones which may be efficiently water-cooled. The piston 43 is the only reciprocating part. Consequently I have provided an engine of great power, coolness, and smoothness of operation.

The disclosed embodiments are not to be construed as limitations upon my invention, the scope of which is deemed to include any desirable constructive modification within the spirit and breadth of the appended claims.

I claim:

1. In an internal combustion engine: a shaft; a frusto-conical valve rotationally driven by said shaft and having limited motion longitudinally and rotationally with respect to said shaft; a seat for said valve; means yielding to torsional drag upon said valve for retarding the rotation of said valve with respect to said shaft; and means holding said valve in contact with said seat and responsive to retardation of said valve with respect to said shaft to release said valve for movement away from said seat.

2. In an internal combustion engine: a shaft; a valve rotationally driven by said shaft, and having limited motion relatively to said shaft both rotationally and longitudinally; a seat for said valve, upon which said valve tightens and loosens by longitudinal movement; means yielding to rotational movement of said valve relatively to said shaft; and means normally exerting end pressure on said valve and responsive to said yielding means for decreasing said pressure to allow said valve to move longitudinally in said seat.

3. In an internal combustion engine, a plurality of individual cylinders secured together in parallel to form an elongated engine block, each cylinder including an integral valve housing; a shaft common to said cylinders extending through said valve housings; frusto-conical valves individual to said cylinders co-axially mounted on said shaft for rotation thereby and having limited longitudinal and rotative motion relative to said shaft; valve seats for said valves in said valve housings; spring means individual to said valves for urging said valves to advanced rotative positions with respect to said shaft; additional spring means individual to said valves urging said valves to advanced longitudinal positions with respect to said shaft; and means responsive to movement of said first mentioned spring means to a position of increased load for moving said additional spring means to a position of decreased action with respect to said valve.

4. In an internal combustion engine, the invention as described in claim 3, in which both said first-mentioned spring means and said additional spring means operate in planes perpendicular to the axes of said valves.

5. In an internal combustion engine: a shaft; a frusto-conical valve aligned axially with said shaft; a seat for said valve; a coupling plate mounted on said shaft and rotated thereby; a torque plate mounted revolubly on said shaft and connected to said coupling plate so as to have limited rotational movement relatively to said coupling plate and said shaft, said torque plate and said valve having inter-engaging key means for rotating said valve in unison with said torque plate, said valve sliding longitudinally on said key means toward and away from said seat; springs connecting said coupling plate and said torque plate and responsive to increased torque upon said valve to yieldingly permit said torque plate to move in the direction of retarded rotation with respect to said coupling plate and said shaft; a cam carried rotatably upon said coupling plate; gear means on said cam; push rods between said cam and said valve, actuable by said cam to exert a seating thrust upon said valve; gear segments mounted on said coupling plate and engaging said gear means for rotating said cam; means on said torque plate and on said gear segments engageable when said springs yield for moving said gear segments and thereby said cam in the direction in which said cam releases said push rods and thereby relaxes the seating thrust upon said valve; and spring means for returning said cam to a position of increased thrust upon said push rods when movement of said torque plate in the direction of advanced relative rotation with respect to said shaft so permits.

6. In an internal combustion engine: a shaft; a frusto-conical valve aligned axially with said shaft; a seat for said valve; a coupling plate mounted on said shaft and rotated thereby; a torque plate mounted revolubly on said shaft and connected to said coupling plate so as to have limited rotational movement relatively to said coupling plate and said shaft, said torque plate and said valve having inter-engaging key means for rotating said valve in unison with said torque plate, said valve sliding longitudinally on said key means toward and away from said seat; springs connecting said coupling plate and said torque plate and responsive to increased torque upon said valve to yieldingly permit said torque plate to move in the direction of retarded rotation with respect to said coupling plate and said shaft; a collar on said shaft, rotating therewith and keyed thereto for relative longitudinal movement; a gear surrounding said collar and threadedly connected thereto; means on said collar engageable with said valve and adapted when said collar is moved longitudinally toward said valve to exert a seating thrust upon said valve; gear segments mounted on said coupling plate and engaging said gear for rotating said gear upon said collar; means on said torque plate and on said gear segments engageable when said springs yield for moving said gear segments and thereby said collar in the direction in which said collar relaxes the seating thrust on said valve; and spring means acting upon said gear for returning said collar in the direction of advance toward said valve when movement of said torque plate in the direction of advanced relative rotation with respect to said shaft so permits.

7. In an internal combustion engine having inlet means, exhaust means, and a combustion chamber: a frusto-conical valve having lateral pockets for bridging between said inlet means and said combustion chamber and between said exhaust means and said combustion chamber;

a shaft for rotating said valve, axially aligned with said valve and with respect to which said valve is axially relatively movable; means responsive to tension for holding said valve in advanced axial position with respect to said shaft; and means yielding to torque upon said valve for relaxing the tension under which said valve is so held.

References Cited in the file of this patent

UNITED STATES PATENTS

| | | |
|---|---|---|
| 1,072,812 | Bertram | Sept. 9, 1913 |
| 1,091,541 | Shafer | Mar. 31, 1914 |
| 1,166,939 | Russell | Jan. 4, 1916 |
| 1,173,132 | Van Keuren | Feb. 22, 1916 |
| 1,229,602 | Francis | June 12, 1917 |
| 1,358,694 | Bauchet | Nov. 16, 1920 |
| 1,372,572 | Stevens | Mar. 22, 1921 |
| 1,375,110 | Rowledge | Apr. 19, 1921 |

FOREIGN PATENTS

| | | |
|---|---|---|
| 1,051,502 | France | Sept. 16, 1953 |